(12) United States Patent
Thornberry et al.

(10) Patent No.: US 8,745,688 B2
(45) Date of Patent: Jun. 3, 2014

(54) METHOD AND DEVICE FOR OPERATING A TELEVISION LOCATED IN A PREMISES TO SIMULATE OCCUPATION OF THE PREMISES

(75) Inventors: Kevin Thornberry, Pudsey (GB); Mark Stephens, Keighley (GB)

(73) Assignee: Eldon Technology Limited, Keighly (GB)

( * ) Notice: Subject to any disclaimer, the term of this patent is extended or adjusted under 35 U.S.C. 154(b) by 21 days.

(21) Appl. No.: 13/234,900

(22) Filed: Sep. 16, 2011

(65) Prior Publication Data

US 2012/0069246 A1 Mar. 22, 2012

(30) Foreign Application Priority Data

Sep. 17, 2010 (EP) ..................................... 10177397

(51) Int. Cl.
*H04N 7/16* (2011.01)

(52) U.S. Cl.
USPC .......................................... 725/141; 709/219

(58) Field of Classification Search
USPC ........... 725/139–142, 151–153; 709/217–232
See application file for complete search history.

(56) References Cited

U.S. PATENT DOCUMENTS

| 5,945,988 A | * | 8/1999 | Williams et al. | ............... | 715/747 |
| 6,177,931 B1 | * | 1/2001 | Alexander et al. | ............... | 725/52 |
| 2009/0210920 A1 | * | 8/2009 | Kondo | ........................... | 725/118 |

FOREIGN PATENT DOCUMENTS

| AU | 2010100017 A4 | 3/2010 |
| EP | 1 187 467 A2 | 3/2002 |
| JP | 2007265021 A | 10/2007 |
| JP | 2008148016 A | 6/2008 |
| WO | 2004073358 A1 | 8/2004 |

* cited by examiner

*Primary Examiner* — Annan Shang
(74) *Attorney, Agent, or Firm* — Lowe Graham Jones PLLC

(57) ABSTRACT

An electronic device operates a television located in a premises to simulate occupation of the premises, and thereby deter intrusion. The electronic device is caused to operate automatically, without any input from a user, and activates the television at different times according to a predetermined schedule not set by the user. During automatic operation, the television is caused not only to present television programming, but also to present visual and sound effects simulating human activity, whereby occupation of the premises is simulated.

20 Claims, 4 Drawing Sheets

METHOD AND DEVICE FOR OPERATING A TELEVISION LOCATED IN A PREMISES TO SIMULATE OCCUPATION OF THE PREMISES

PRIORITY CLAIM

This application claims the benefit of and priority to European patent application entitled "A Method and Device for Simulating Occupation of the Premises", having application serial number 10177397.6, filed Sep. 17, 2010, and which is incorporated herein by reference in its entirety.

BACKGROUND

Of concern for many homeowners is the security of their property when away from their home for extended periods of time, whether for vacation or business. To deter potential intruders from entering the home, the homeowner may take various precautions to present an appearance that the home remains occupied throughout the homeowner's absence. Such precautions often include installing timers to turn on and off table lamps during the evening hours. However, such activity often does not bear a close resemblance to the more complex activities typically displayed by the occupants of the home. In the alternative, the homeowner may employ someone to enter the home on a daily basis and turn on and off the lighting in a more random fashion, but such a task is rather labor-intensive. Generally, short of inviting a live-in house-sitter for the duration of the homeowner's absence, the activities of a resident of the home over a period of several days may be difficult to recreate in a convincing fashion.

JP2008148016 proposes that a home server be provided and that it be connected to household appliances, TV and audio apparatus and other means. This home server then switches apparatus on and off according to a schedule developed from previous usage. Of course, this is a complex arrangement which requires rewiring of the premises.

JP2007265021 suggests providing dedicated equipment which can produce the sounds of ordinary living. However, this equipment, is not only an added expense in that it will be provided in addition to the normal equipment in the house, but it also has no sophistication in that it produces sound and visual effects quite randomly.

SUMMARY

The present invention seeks to provide a better solution to the problem of securing unoccupied premises.

According to a first aspect of the present invention, there is provided a method of employing a television located in a premises to simulate occupation of the premises, the method comprising:

setting an electronic device to operate automatically without any input from a user, wherein the electronic device is able to receive broadcast programming, and is coupled to a television to control the television and to cause the television to present selected programming; and during automatic operation, the electronic device activating the television at different times according to a predetermined schedule not set by the user, and causing the television, when activated, to present programming including television programming and/or visual and sound effects simulating human activity.

In embodiments of the invention, the television may be operated to present programming in a manner representative of a householder's usual viewing habits. Additionally and/or alternatively, the television might be switched from program to program in a channel-surfing manner. Additionally and/or alternatively, visual and sound effects from the television might emulate activities such as switching lights on and off, or opening or closing doors and the like. Someone external to the premises is likely to be convinced that the premises are occupied, or, in any event be deterred from attempting to enter the premises.

In a preferred embodiment, the electronic device activates the television according to the predetermined schedule which determines the times at which the television is to present television programming and determines the broadcast channels to be presented, where said schedule has been generated randomly, from information as to television usage by a number of users and/or by previous usage of the television by a user.

For example, the electronic device may activate the television to present visual and sound effects simulating activities such as doors opening and closing, and/or lights being turned on and off, and/or the effects of household appliances, and/or the sounds of human voices.

Preferably, the visual and sound effects have been pre-recorded and stored by the electronic device.

In an embodiment, conflicts between the presentation of television programming and the presentation of visual and sound effects are resolved in favour of the presentation of visual and sound effects.

Of course, any such conflicts might be resolved in any other manner. Furthermore, it may be arranged to resolve conflicts differently in accordance with the time of day.

The electronic device activates the television according to the predetermined schedule which has not been set by the user, that is, the predetermined schedule is not compiled by the user and is determined without user intervention. The predetermined schedule might be compiled from historic information stored in the electronic device which has been obtained from the use of the television by the user, but the predetermined schedule is not the result of a user physically inputting elements of the schedule.

It would be possible for the predetermined schedule to be an entirely random selection of channels and times, but such a selection is likely to be less than convincing. In one embodiment, the schedule is generated from usage data collected from the television coupled to the electronic device, the collected usage data indicating the times at which the television has been controlled by a user to present television programming, and the broadcast channels selected by the user for presentation at those times, and wherein the generated schedule has been stored by the electronic device.

Additionally and/or alternatively, the schedule has been generated from usage data collected from a number of users, and/or the schedule has been modified to include randomly generated time and channel information, and/or to provide for channel-surfing.

Preferably, the electronic device is set to operate automatically by way of a user input thereto. That is, the user starts the automatic operation of the electronic device. Alternatively, the electronic device is set to operate automatically by way of a timing circuit of the electronic device.

The present invention also extends to an electronic device for operating a television located in a premises to simulate occupation of the premises, the electronic device including:

input means for receiving broadcast programming; and control circuitry for controlling the television and for causing the television to present selected programming;

wherein the electronic device can be set to operate automatically, without any input from a user, and wherein, during automatic operation, the electronic device activates the television at different times according to a predetermined schedule not set by the user, and causes the television, when activated, to present programming including television programming and/or visual and sound effects simulating human activity.

Preferably, the electronic device further comprises memory in which simulation information to provide visual and sound effects is stored, wherein the electronic device can activate the television to present visual and sound effects simulating activities such as doors opening and closing, and/or lights being turned on and off, and/or the effects of household appliances, and/or the sounds of human voices.

In an embodiment, the electronic device further comprises memory in which an electronic program guide is stored, and a user interface enabling a user to select programs from the electronic program guide, wherein the control circuitry may cause the identity of programs selected by a user to be stored to generate usage data to be stored in data storage of the electronic device.

For example, the control circuitry is arranged to generate the predetermined schedule from the usage data stored in the data storage, the stored usage data indicating the times at which the television has been controlled by a user to present television programming, and the broadcast channels selected by the user for presentation at those times, and wherein the generated schedule has been stored by the electronic device.

The invention also extends to a method of employing a television located in a building to deter intrusion thereof, the method comprising:

storing usage data of a television receiver coupled with the television, wherein the usage data indicate times of day during which the television receiver is being operated by a user, and programming channels accessed by the television receiver during the times of day;

generating a schedule based on the stored usage data, wherein the schedule indicates scheduled times of day for activating the television and programming channels to be accessed by the television receiver during the scheduled times of day without user guidance;

receiving an indication to operate the television and the television receiver without user guidance; and operating the television and the television receiver according to the schedule in response to the indication.

The indication may be received via user input to the television receiver, or via a timer circuit of the television receiver.

The method may further comprise recording television content at the television receiver based on recording information generated from user input; and operating the television and the television receiver according to the recording information in response to the indication.

For example, operating the television according to the recording information may be limited to predetermined times of day.

Conflicts between the schedule and the recording information may be resolved in favor of the recording information.

The method may further comprise generating simulation information for simulating light sources other than the television, wherein the simulation information comprises brightness and timing information; and operating the television and the television receiver according to the simulation information in response to the indication.

Conflicts between the schedule and the simulation information may be resolved in favor of the simulation information.

The simulation information may be based upon the stored usage data.

In an embodiment, operating the television and the television receiver according to the simulation information comprises generating a pattern on a display of the television that simulates the appearance of human activity within the building.

Operating the television and the television receiver according to the simulation information may comprise generating a screensaver pattern on a display of the television according to the brightness and timing information of the simulation information.

The method may further comprise generating simulation information for simulating audible sources other than the television, wherein the simulation information comprises audio level and timing information; and operating the television and the television receiver according to the simulation information in response to the indication.

According to a further aspect of the invention, there is provided a television receiver, comprising:

an input interface for receiving television content from a content source over a plurality of programming channels;

an output interface for delivering selected portions of the received television content to a television;

a user interface for receiving user input to control operation of the television receiver; and control circuitry arranged to:
  store information regarding usage of the television receiver as controlled via the user input, wherein the usage information indicates the selected portions of the received television content being output to the television;
  generate scheduling information based on the stored usage information, wherein the scheduling information indicates portions of the received television content to be output to the television in the absence of the user input; and
  operate the television and the television receiver according to the scheduling information in the absence of the user input.

In an embodiment, the control circuitry operates the television by activating and deactivating the television via a control bus associated with the output interface.

The television receiver may further comprise:
  data storage for storing an electronic program guide accessible via the user interface, wherein the electronic program indicates times and programming channels associated with each program of the received television content;
  wherein the usage information comprises information from the electronic programming guide.

The television receiver may further comprise:
  data storage for recording selected portions of the received television content according to the user input received via the user interface;
  wherein the control circuitry is arranged to:
  generate recording information based on the user input to record the selected portions of the received television content into the data storage; and
  activate the television and output the selected portions of received television content being recorded via the output interface according to the recording information.

Preferably, the control circuitry is arranged to:
  generate simulation information for simulating light sources other than the television, wherein the simulation information comprises brightness and timing information; and
  activate the television and operating the television receiver according to the simulation information.

The invention also extends to an information node, comprising:

a communication interface configured to receive usage information from a television receiver, wherein the usage information identifies television programming being transferred to a television by the television receiver under user control;

data storage configured to store the usage information; and control circuitry configured to:
process the usage information to generate scheduling information indicating television programming to be delivered by the television receiver to the television in the absence of user control; and
transmit the scheduling information via the communication interface to the television receiver.

Preferably, the scheduling information comprises times of day during which the television is to be powered on, and television channels from which the television receiver is to deliver television programming to the television.

The scheduling information may comprise a code for each program of television programming to be delivered by the television receiver to the television.

BRIEF DESCRIPTION OF THE DRAWINGS

Preferred and alternative embodiments are described in detail below with reference to the following drawings.

DETAILED DESCRIPTION

Figure 1:
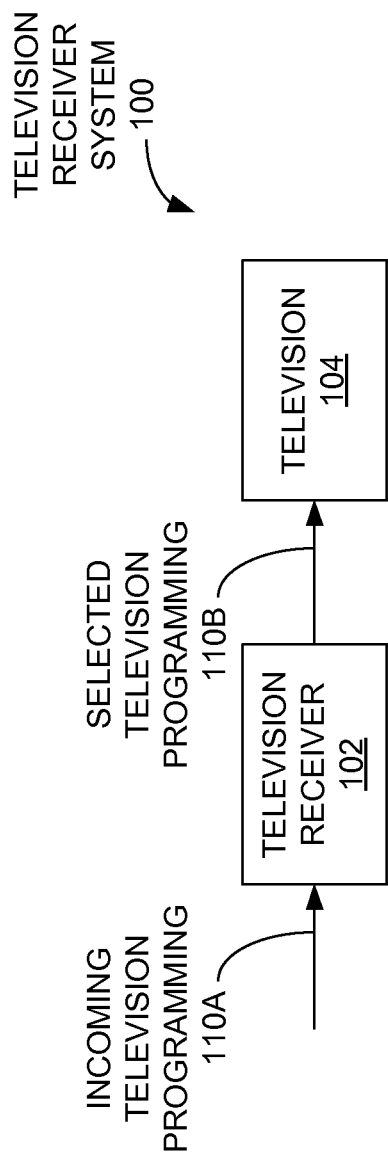
FIG. 1 shows a simplified block diagram of a television receiving system.

As described below, a television receiver, such as a satellite, cable, or terrestrial television receiver or "set-top box", may be used to activate and control a television to mimic or simulate the presence of one or more persons in a place of residence. FIG. 1 is a block diagram of a television receiver system 100 including a television receiver 102 connected to a television 104. The receiver 102 is arranged to receive incoming television programming 110A, such as programming transmitted from a satellite transponder, cable head-end, or terrestrial antenna, and forward portions or programs 110B of the received programming 110A that have been selected by a user to the television 104 for presentation to the user. The incoming television programming 110A is transmitted to the television receiver 102 over multiple programming channels, such as those associated with various cable news and sports networks, movie channels, local television outlets, and the like.

Figure 2:
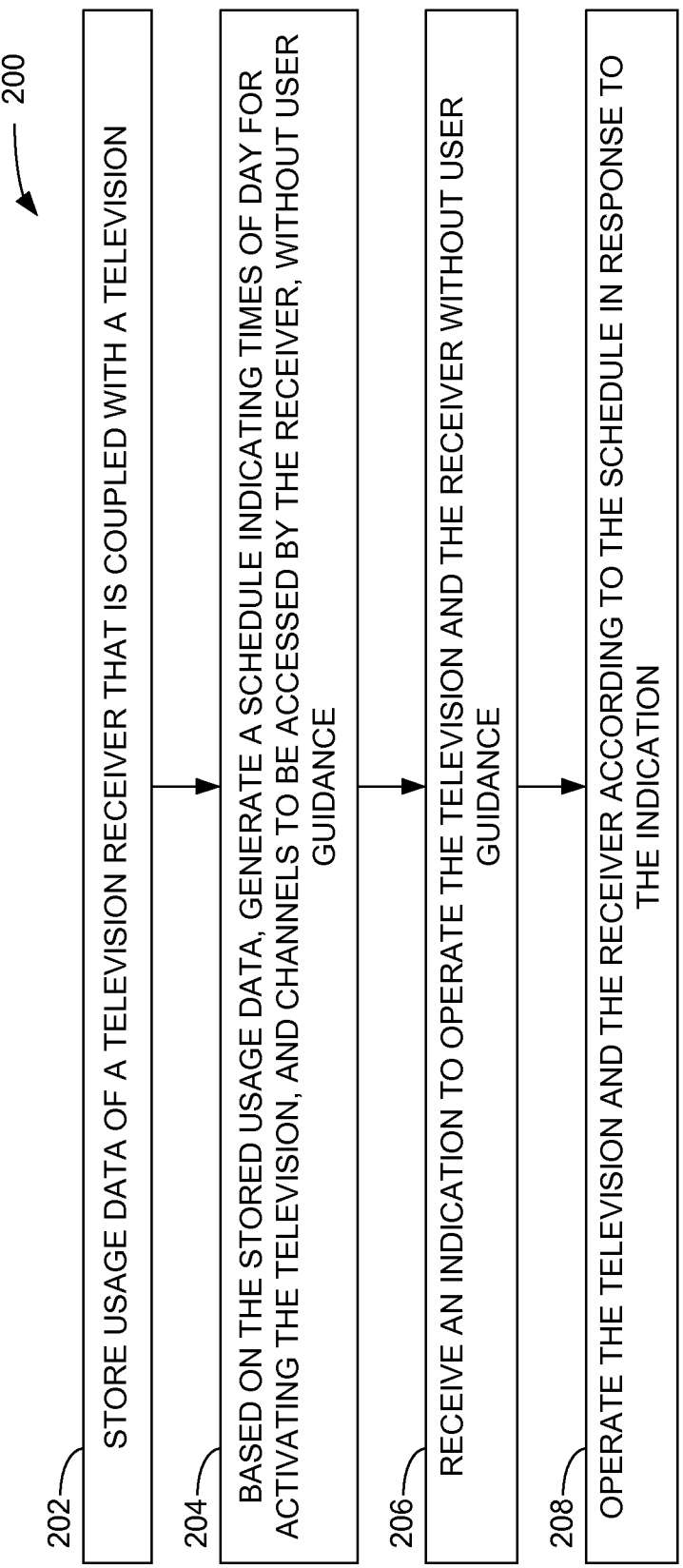
FIG. 2 is a flow diagram of a method of the invention of employing a television located in a building to deter intrusion of the building.

FIG. 2 presents a flow diagram of a method 200 for employing the television 104 located in a user premises or building to deter intrusion. In the method 200, usage data of the television receiver 102 coupled with the television 104 are stored (operation 202). The usage data may indicate the times of day during which the television receiver 102 is operated by a user, as well as the programming channels selected in the receiver 102 for receipt of programming during those times of day. In one example, the particular times and channels are noted explicitly in the usage information. In another implementation, the particular programs being watched, such as by way of a unique program code, are noted or logged as the usage data.

Based on the stored usage data, a schedule is generated which indicates scheduled times of day for activating the television 104, as well as the television channels to be selected by the television receiver 102 during the scheduled times of day for output via the television 104, without user guidance (operation 204). In one implementation, this data is specified directly, while in another example, the schedule indicates the programs to be presented via the television 104 by way of some code or identifier for each program. An indication to operate the television 104 and the television receiver 102 without user guidance is received (operation 206). In response to the indication, the television 104 and the connected receiver 102 are operated according to the schedule (operation 208).

In an embodiment, the method 200 may be implemented by way of a non-transitory computer-readable storage medium (such as volatile or nonvolatile digital memory) having stored thereon instructions executable by a processor or other form of control circuitry of the television receiver 102, either alone or in combination with another device, to perform the method 200. Also, while the operations of the method 200 are shown as taking place in a strict order, other orders of operation, such as at least partial concurrent execution of two or more of the operations, are also possible.

As a result of employing the method 200, the television receiver 102 can operate the television 104 in a way that mimics or simulates the operation of the television 104 and the receiver 102 as the user has done historically. Such operation may thus facilitate a more realistic representation of user behavior within the user premises, thus providing a more effective deterrent to home invasion by a burglar or other would-be intruder. In further embodiments to be discussed below, the television receiver 102 may further employ the television 104 to mimic other aspects of an occupant's normal behavior, such as lighting and movement within the building.

Figure 3:
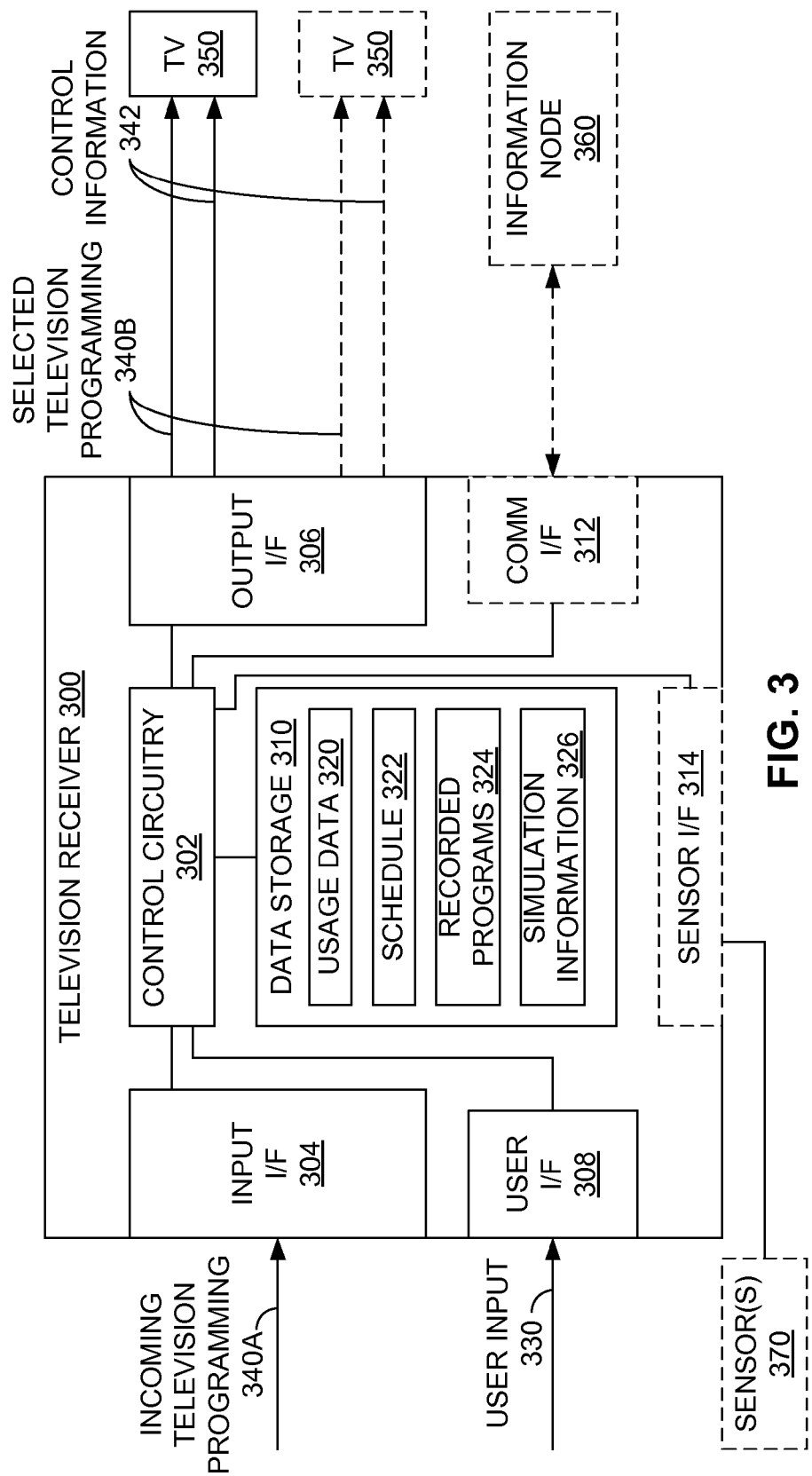
FIG. 3 shows a block diagram of a television receiver of an embodiment of the invention.

FIG. 3 shows a block diagram of a television receiver 300. Examples of the television receiver 300 include, but are not limited to, satellite, cable, and terrestrial television receivers or set-top boxes. Digital video recorders (DVRs), digital video disk (DVD) players, computers, and mobile communication devices capable of performing the operations described below may also serve as the receiver 300. The receiver 300 includes an input interface 304, an output interface 306 coupled with a television 350, a user interface 308, data storage 310, and control circuitry 302. The receiver 300 may also include a separate communication interface 312 for communicating with an information node 360. The television receiver 300 may also include other circuitry, such as a power supply and a "smart card" interface. However, such circuitry is not shown in FIG. 3 nor described further herein.

The input interface 304 is arranged to receive incoming television programming 340A by way of a satellite, cable head-end, terrestrial antenna, or other television signal source. For example, in the case of a satellite receiver 300, the input interface 304 may be coupled to a parabolic antenna with an attached low-noise block-converter (LNB) that receives the signals, down-converts the frequencies thereof, and forwards the resulting intermediate-frequency (IF) signals carrying the incoming television programming 340A to the input interface 304. In turn, the input interface 304 may demodulate, demultiplex, decrypt, and otherwise process the television signals for use by the output interface 306. More specifically, the demultiplexing process may involve the selection of one or more channels of television programming based on user input for viewing and/or recording of the programming carried on the selected channel. In one implementation, the signal carries multiple television programming channels whose data is formatted according to one of the Motion Picture Experts Group (MPEG) formats, such as MPEG-2 or MPEG-4, although other television content format standards may be utilized.

The output interface 306 reformats and delivers the television programs from the input interface 304 as selected television programming 340B to the television 350. To that end, the output interface 306 may encode the television programming 340B in accordance with one or more television output formats. For example, the output interface 306 may format the programming 340B for one or more of a composite or component video connection with associated audio connection, a modulated radio frequency (RF) connection, a High-Definition Multimedia Interface (HDMI) connection, or any other format compatible with the television 350.

As shown in FIG. 3, the output interface 306 also issues control information 342 generated in the control circuitry 302 to control and otherwise operate the television 350. In one particular example in which the output interface 306 is an HDMI, the control information 342 may be transmitted to the television 350 over the Consumer Electronics Control (CEC) portion of the HDMI. Other forms of the output interface 306 may employ a similar control bus technology suitable for transmitting the control information 342 to the television 350.

The receiver 300 may employ a separate control interface for transferring the control information 342 to the television 350. One such control interface may be a remote control output interface adapted to transfer the control information 342 as wired or wireless commands, such as those commands that may be carried via IR, RF, or other wireless signals to a receiving circuitry of the television 350. In one example of the use of IR technology, the control interface may employ an optical fiber or "tether" with an IR transmitter located at the end of the tether. This configuration allows the IR transmitter to be located proximate to the IR remote control receiver of the television 350 for the transfer of the control information 342 to the television 350. In another example, the IR transmitter may be located within the chassis of the receiver 300, wherein the IR transmitter is driven with sufficient power to allow the IR signals to reflect off of room walls and furniture to the IR receiver of the television 350.

To allow a user of the receiver 300 to control the selection of the input television programs 340A and perform other operations typically associated with a television receiver 300, the user interface 308 may facilitate the entry of commands by way of user input 330. In many examples, the user interface 308 may be a remote control interface configured to receive such input 330 by way of IR, RF, acoustic, or other wireless signal technologies. To facilitate such information entry, the receiver 300 may provide a menu system presented to the user via the television 350. In some implementations, the user interface 308 may also include any of a keyboard, mouse, and/or other user input device.

The receiver 300 also includes data storage 310 which may be used for storing one or more recorded programs 324 of the input television programming 340A, or portions thereof, for subsequent viewing by the user via the television 350. As a result, the data storage 310 may be operated as an integrated digital video recorder (DVR). As described hereinafter, the data storage 310 may also store usage data 320 indicating a user's previous use of the receiver 300 and connected television 350, and a generated schedule 322 based on the usage data 320. The data storage 310 may include any kind of volatile data memory (such as static random-access memory (SRAM) and dynamic random-access memory (DRAM)) and/or non-volatile memory (including, but not limited to, flash memory, hard disk drive storage, and optical disk storage).

The communication interface 312, if incorporated into the receiver 300, is arranged to facilitate the transfers of data, such as the usage data 320 and/or the schedule 322, between the receiver 300 and an information node 360. In one example, the information node 360 operates as an information server employed by a television programming service provider to generate the schedule information 322 based on the usage data 320 logged at the receiver 300.

The communication interface 312 may be any wired or wireless communication interface arranged to communicate over the Internet or other wide-area network (WAN), over a local-area network (LAN), or via another communication network. Examples of the communication interface 312 may include, but are not limited to, an Ethernet interface, a Wi-Fi (IEEE 802.11x) interface, a Bluetooth® interface, and a HomePlug® interface. Further, the communication interface 312 may be arranged to communicate over the Internet or other communication network via a Digital Subscriber Line (DSL) gateway, a cable modem, or other intermediate communication device either external to, or incorporated within, the receiver 300.

The control circuitry 302 may include one or more processors, such as a microprocessor, microcontroller, or digital signal processor (DSP), arranged to execute memory-stored instructions for directing the processor to perform the functions more specifically discussed below via interaction with any or all of the input interface 304, the output interface 306, the user interface 308, the data storage 310, and possibly the communication interface 312 (if present). The control circuitry 302 may be completely hardware-based logic, or may include a combination of hardware, firmware, and/or software elements.

In operation, the control circuitry 302 receives and processes commands from the user via the user interface 308 for selection of one or more channels of incoming television programming to be viewed, or to be recorded for subsequent viewing. Further, the control circuitry 302 may log or track some or all of the received commands to generate usage data 320 to be stored in the data storage 310 of the receiver 300. More specifically, the control circuitry 302 may determine which channels the user has selected for viewing, as well as the day and time at which the channel selection occurred. The resulting usage data 320 may include this detailed information directly, including channel "up" or "down" actions only fractions of seconds apart, as may be typical when a user is "channel-surfing".

The control circuitry 302 may correlate the channel changes, along with the associated days and times, to particular television programs being broadcast at the associated channel and time. In one example, the control circuitry 302 may perform this correlation using data from an electronic program guide (EPG) supplied to the television receiver 300, such as by way of the input interface 304 or the communication interface 312. The control circuitry 302 may then store the identity of the programs (such as a unique code or data item identifying the program) in lieu of, or in addition to, the channel, day, and time information described above as the usage information 320.

In addition, the control circuitry 302 may filter or otherwise process the usage information 320 as the information 320 is being collected, or after the information 320 is stored in the data storage 310. For example, times during which the user remains on a particular channel for only a few seconds or less may be ignored or edited from the usage information 320.

The control circuitry 302 may also log other commands not directly associated with channel change commands issued by a user. For example, commands issued by a user to record a particular program or channel via a recording timer may also be logged or tracked, with an indication thereof being stored in the usage data information 320. As before, such information may be stored according to a day/time/channel scheme, or may be logged according to the particular program or presentation being recorded.

The control circuitry 302 may receive usage information derived from the operation of other receivers 300 by other users. Such other receivers 300 may be located in the same building, city, state, or nation as the first receiver 300. Further, such additional usage information may be aggregated by the first receiver 300, or by some server or other communication node and thereafter transmitted to the first receiver 300 via the communication interface 312, for example.

Based on the usage information 320, the control circuitry 302 may then generate a schedule 322 according to which the television receiver 300 and the attached television 350 may be operated in the absence of the user. In one example, the schedule 322 is generated in response to user input 330 indicating when the receiver 300 and the television 350 are to be placed in automatic operation, during which the control circuitry 302 controls both the receiver 300 and the television 350 to display programming in order to project the appearance of activity within the home or building. Additionally and/or alternatively, the control circuitry 302 may generate and periodically modify the scheduling information 322 as the usage information 320 is logged prior to a request for the automatic mode.

As with the usage data 320, the scheduling information 322 may include specific day, time, and channel information indicating to which channels, and at what times, the control circuitry 302 is to tune the input interface 304 of the receiver 300, with the resulting programming being delivered to the television 350 via the output interface 306 for display. The scheduling information 322 may include a list of programs which the control circuitry 302 is to display via the television 350. Moreover, the control circuitry 302 may determine when the program cited in the scheduling information 322 by consulting EPG information that is periodically downloaded via the input interface 304, the communication interface 312, or another interface not explicitly depicted in FIG. 3.

The scheduling information 322 may be modified or varied in a random or pseudo-random manner to vary the expected user behavior patterns specifically indicated in the usage data 320. As a result, as many users may not watch the same television programs 324 from week to week, this variation in the scheduling information 322, as well as audio volume level and other aspects of the program 324 presentation, may result in a more realistic usage pattern. In one example, the variations may include short periods of simulated channel-surfing, as what might be expected at various times during a user viewing session.

The scheduling information 322 may also include indications for any programs 324 that the user has instructed the receiver 300 to record. Thus, in addition to any programs being displayed as a result of a user's past usage, programs that are to be recorded while the user is absent from the premises may also be displayed by way of the programming information or instructions previously entered by the user. Further, in situations in which a program 324 is being recorded during a time when the scheduling information 322 indicates that another program is to be displayed in automatic mode, the program 324 being recorded may be selected for presentation to the television 350 for display. Giving the recorded program 324 a higher priority in this case may be important in situations in which the input interface 304 employs a single tuner circuit, as displaying the program cited in the scheduling information 322 as a result of the usage data 320 may prevent the desired recording of the program 324.

The scheduling information 322 may additionally and/or alternatively cause the control circuitry 302 to display recorded programming 324 that was previously stored in the data storage 310. In one example, the control circuitry 302 may display the previously recorded programming 324 via the output interface 306 and the television 350 during times when incoming television programming 340A is not available at the receiver 300. In one example, this unavailability may be due to technical problems associated with the source of the programming 340A, the receiver 300, or another device responsible for transmitting or receiving the incoming programming 340A.

During times in which the control circuitry 302 is tuning to various channels and particular times described in the schedule 322, the control circuitry 302 may also transmit control information 342 to the television 350 to ensure that the television 350 is activated (i.e., powered on) during the times when programming is to be displayed on the television 350. In one example, if the television 350 is coupled to the output interface 306 of the receiver 300 via HDMI, and is capable of receiving and processing CEC commands issued over HDMI, the control circuitry 302 may transfer control information 342 instructing the television 350 to turn on or off at the appropriates times dictated by the schedule 322. In other circumstances, the control circuitry 302 may transmit the control information 342 via IR, RF, or other communication means, to the television 350.

The control circuitry 302 may also employ the CEC control path or any of the other communication means to control other aspects of the television, such as the audio volume. Further, such aspects may also be specified in the scheduling information 322. For example, the volume at which the television 350 is to operate may depend upon the time of day.

To set the receiver 300 into a mode in which the scheduling information 322 is employed to operate the receiver 300 and the television 350 in the absence of the user, the user may issue a command as user input 330 to the user interface 308 to place the receiver 300 into the automatic mode. For example, the user may indicate that the receiver 300 is to enter the automatic mode immediately. Alternatively, the user may set a future day and time at which the automatic mode is to begin. In that case, the control circuitry 302 may employ a timer circuit to initiate the automatic mode in the receiver 300. Similarly, the user may end automatic mode immediately, or by way of setting a day and time for termination of the mode. The control circuitry 302 may provide a visual menu system via the television 350 through the output interface 306. The user then utilizes the information presented in the menu system to enter the commands via the user interface 308.

In addition to indicating if and when to initiate or terminate the automatic mode, the user may also enter information via the user interface 308 to control various aspects of the receiver 300 while operating in automatic mode. For example, the user may set limits on the hours of day or night during which the television 350 may be on, preset the audio volume level as provided by the receiver 300 or the television 350, and dictate other operating parameters for operating the receiver 300 and the television 350 during automatic mode.

The receiver 300 may control its own operation and that of the television 350 while the receiver 300 is in automatic mode as though the user were present and actively operating the units 300, 350, thus dissuading would-be intruders from entering the home or building in which the receiver 300 and television 350 are located. Given that the television 350 typically is capable of producing a wide range of visual colors and brightness levels, and a significant range of audio frequencies and volume levels, the television receiver 300 may be employed to generate sights and sounds beyond that produced by television programs in order to simulate human activity normally associated with the home environment. Such activity may include the turning on and off of lights, the opening and closing of doors, and so forth.

To provide this functionality, the control circuitry 302 may be arranged to receive or generate simulation information 326, such as video and/or audio information, to be presented to the user via the television 350. The simulation information 326 provides light and sound information that, when presented via the television 350, provides the appearance of human activity within the home or other building in which the television 350 is located. Such activity might include the opening and closing of doors (which may alter the amount of light in a room), the turning on or off of overhead lights or table lamps, and so on. The simulation information 326 may also include audio information that mimics human voices, the sounds of doors and the like opening and closing, the sounds emitted by household appliances, and so on. The video and/or audio information may include pre-recorded or pre-generated visual and sound effects that are received at the receiver 300, or previously stored therein, and employed by the control circuitry 302 to produce the associated video and/or audio for presentation via the television 350 or other output device.

To produce the various visual effects, the simulation information 326 may include video information that appears as a type of screen saver when displayed on the television 350. For example, the video information may create abstract patterns providing variations in light intensity, color, and/or movement akin to a screen saver that, when viewed from a location external to the home, creates the appearance of human activity occurring within the home. Further, by employing a screen saver type of appearance, less annoyance may result when viewed by a person who is authorized to be in the home periodically. In one example, each particular visual effect (e.g., the opening and closing of a door that leads into a lighted room) may be represented by a separate video file whose data is to be transmitted to the television 350 for display.

The simulation information 326 may also include audio information that, when transmitted to and reproduced on the television 350 or another audio-generating device, produces one or more sound effects, as described above. In one implementation, each of these sound effects is stored as a separate audio file to be played under the control of the control circuitry 302 via the output interface 306 and the television 350 or other audio-generating device, such as a stereo sound system. The audio information may include, for example, overall audio volume level, audio waveform or sample information describing the particular sound effect.

The visual and/or audio information within the simulation information 326 may be stored initially in the data storage 310 of the receiver 300, or the control circuitry 302 may receive the information from the information node 360 via the communication interface 312. The simulation information 326 also includes timing information indicating when each of the visual or audio effects is to be presented via the television 350. Such information may include a particular day and time at which the visual and/or audio effect is to be presented. The timing of the effects may be based on the usage information 320 stored in the data storage 310, or may be more randomized. Further, the control circuitry 302 of the television receiver 300 may generate the timing information itself, or receive the timing information from an external source, such as the information node 360 of FIG. 3.

At times, the display of television programming according to the scheduling information 322 may overlap the presentation of audio and/or video effects as designated in the simulation information 326. In such cases, the control circuitry 302 may implement a priority scheme to decide whether the programming or the effects are to be displayed via the television 350. The control circuitry 302 may present the effects instead of the programming for at least the time during which the effect is being displayed, as the effects may overwhelm the television programming display in some cases. Alternatively, the control circuitry 302 may select the programming over the effects if a timing conflict occurs.

The control circuitry 302 or the output interface 306 may possess the ability to combine or mix the presentation of the television programming and the audio/video effects in cases of a timing overlap. For example, the receiver 300 may possess the ability to mix the audio of a television program currently being presented with the audio of an audio effect so that both may be presented concurrently via the television 350, audio system, or the like. Also, the control circuitry 302 may override an ongoing television program presentation with a video effect, such as a simulation of a table lamp being turned on, for as long as the video effect is to be presented via the television 350.

As with the presentation of the television programming via the television 350 according to the schedule 322, the control circuitry 302 is arranged to ensure that the television 350 is powered on prior to the transfer of the audio and/or video effects via the output interface 306 to the television 350 to ensure that the effects are displayed.

To enhance the deterrent effects of the receiver 300 and the television 350, the receiver 300 may include a sensor interface 314 configured to receive signals from one or more sensors 370, such as motion sensors, audio sensors, and the like, located about and outside the home, and forward an indication of the signals to the control circuitry 302. In response to receiving signals from the sensors 370 indicating that someone has approached the home, the control circuitry 302 may alter the operation of the receiver 300 and or the television 350. These possible alterations include, but are not limited to, reducing the volume of an ongoing program presentation momentarily, simulating the activation or deactivation of an indoor light, and deactivating the television 350. Other additional light and/or sound activity may be produced via the receiver 300 and the television 350, either in response to signals from the sensors 370, or even in some random or pseudo-random fashion in the absence of the detection of an intruder.

As shown in FIG. 3, the receiver 300 may possess the capability to communicate with and control multiple televisions 350, such as those located in separate rooms of the same home. For example, the input interface 304 may incorporate at least two tuner or channel selector circuits, with at least one tuner circuit being utilized for each of two televisions 350. As a result, usage data 320 from multiple televisions 350 may be employed to create different schedule information 322 for each television 350, thereby enhancing the realism of the deterrent. Moreover, different simulation information 326 may be employed to generate different home activity effects for the different rooms in which the televisions 350 are located.

While much of the discussion above focuses on a system that includes a television 350 and a separate television receiver 300, other embodiments may employ a combined television 350/receiver 300 device, such as a laptop computer, mobile communication device, and so on.

Figure 4:
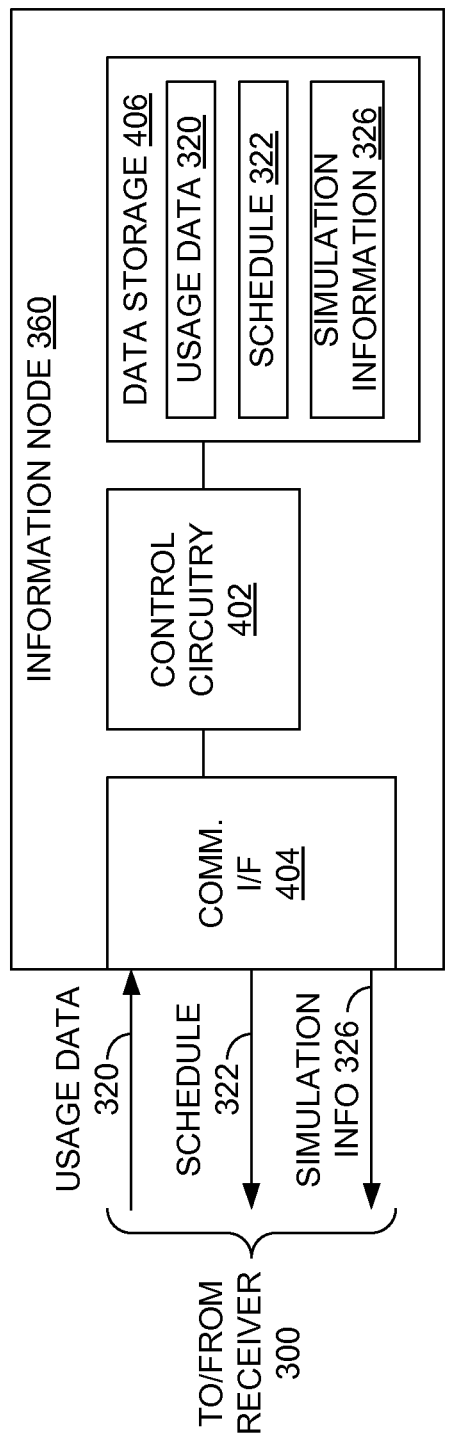
FIG. 4 is a block diagram of an information node.

In addition, while the receiver 300 is depicted above as performing most of the data generation and device control functions, the information node 360 noted in FIG. 3 may perform at least some of these duties, thus reducing the overall processing workload and bandwidth requirements of the control circuitry 302 to perform the various tasks described herein. An example of the information node 360 is presented in the block diagram of FIG. 4. The node 360 includes control circuitry 402, a communication interface 404, and data storage 406, which may be similar in capability and construction to the control circuitry 302, the communication interface 312, and the data storage 310 of the television receiver 300, as described above. In one example, the information node 360 is operated by the same television service provider supplying the incoming television programming 340A to the receiver 300, although nodes 360 operated by other entities may be employed in the alternative.

The communication interface 404, such as an interface capable of communicating with the receiver 300 via the Internet, WAN, LAN, or other communication network may receive from the receiver 300 the usage information 320 described above, and store the usage information 320 in the data storage 406. After the node 360 collects some predetermined amount of the usage information 320, or in response to a request from the receiver 300, the control circuitry 402 may generate the scheduling information 322 and transfer the information 322 via the communication interface 404 to the receiver 300. Similarly, the information node 360 may generate and transfer the simulation information 326 ultimately employed in the receiver 300 in a similar fashion. Further, the information node 360 may provide these information sets 322, 326 for multiple receivers 300 after receiving usage data 320 from each of the receivers 300.

The methods described utilise a television located within a personal residence or other building to simulate the presence of an occupant. This should deter potential intruders. Thus, if a television is operated in a manner which is typical for the resident, a potential burglar is more apt to believe that the home is currently occupied, and thus represents a less-than-desirable target. Furthermore, the television may be used to generate visual and/or audio effects that simulate various recognizable human activities, such as operating lights and household appliances, opening doors, moving objects, and the like, thus enhancing the appearance that a building is occupied.

It will be appreciated that modifications in, and variations to, the embodiments as described and illustrated may be made within the scope of the appended claims. For example, whilst various embodiments have been described within the context of television receivers or set-top boxes, other electronic devices capable of controlling and communicating with a television or monitor device, such as a computer, DVR, DVD player, or mobile communication device, may alternatively incorporate the required functionality.

The invention claimed is:

1. A method of simulating occupation of a premises, the method comprising:
   setting an electronic device to operate automatically without any input from a user, wherein the electronic device is operable to receive broadcast programming, and is operable to couple to a television located in the premises to control the television and to cause the television to present selected programming; and
   during automatic operation, causing the electronic device, without a presence of the user at the premises, to activate the television at different times according to a predetermined schedule not set by the user;
   wherein the predetermined schedule determines the times at which the television is to present television programming and determines the broadcast channels to be presented; and
   wherein the method further comprises causing the television, during automatic operation without the presence of the user at the premises, to present programming, including at least television programming, and to present on the television visual and sound effects simulating human activity, whereby occupation of the premises is simulated when the user is not present at the premises.

2. A method according to claim 1, wherein the predetermined schedule has been at least one of generated randomly, generated from information as to television usage by a number of users, and generated by previous usage of the television by the user.

3. A method according to claim 1, wherein the electronic device activates the television to present on the television at least one of visual and sound effects simulating activities of the user, including at least one of doors opening and closing, lights being turned on and off, effects of household appliances, and sounds of human voices.

4. A method according to claim 3, wherein the visual and sound effects have been pre-recorded and stored by the electronic device.

5. A method according to claim 1, further comprising resolving conflicts between the presentation of television programming and the presentation on the television of visual and sound effects simulating activities of the user in favour of the presentation of visual and sound effects.

6. A method according to claim 1, wherein the electronic device activates the television according to the predetermined schedule, wherein the schedule has been generated from usage data collected from the television coupled to the electronic device, the collected usage data indicating the times at which the television has been controlled by the user to present television programming, and the broadcast channels selected by the user for presentation at those times, and wherein the generated schedule has been stored by the electronic device.

7. A method according to claim 6, wherein the schedule has alternatively been generated from usage data collected from a number of users, wherein the schedule has been modified to include at least one randomly generated time and channel information, and to provide for channel-surfing.

8. A method according to claim 1, wherein the electronic device is set to operate automatically by way of a user input thereto.

9. A method according to claim 1, wherein the electronic device is set to operate automatically by way of a timing circuit of the electronic device.

10. An electronic device for simulating occupation of a premises, the electronic device including:
    input means for receiving broadcast programming; and
    control circuitry for controlling a television located in the premises and for causing the television to present selected programming;
    wherein the electronic device can be set to operate automatically, without any input from a user, and wherein, during automatic operation without a presence of the user at the premises, the electronic device activates the television at different times according to a predetermined schedule not set by the user;

the predetermined schedule determining the times at which the television is to present television programming and determines the broadcast channels to be presented; and wherein, without the presence of the user at the premises, when activated, the electronic device causes the television to present on the television at least one of programming, including television programming, and visual and sound effects simulating human activity, whereby occupation of the premises is simulated when the user is not present at the premises.

11. An electronic device according to claim 10, wherein the predetermined schedule has been generated randomly, from information as to television usage by at least one of a number of users and by previous usage of the television by the user.

12. An electronic device according to claim 10, further comprising memory in which simulation information to provide visual and sound effects is stored, wherein the electronic device can activate the television to present visual and sound effects simulating activities, the activities including at least one of doors opening and closing, lights being turned on and off, the effects of household appliances, and sounds of human voices.

13. An electronic device according to claim 10, further comprising memory in which an electronic program guide is stored, and a user interface enabling the user to select programs from the electronic program guide, wherein the control circuitry may cause the identity of programs selected by the user to be stored to generate usage data to be stored in data storage of the electronic device.

14. An electronic device according to claim 13, wherein the control circuitry is arranged to generate the predetermined schedule from the usage data stored in the data storage, the stored usage data indicating the times at which the television has been controlled by the user to present television programming, and the broadcast channels selected by the user for presentation at those times, and wherein the generated schedule has been stored by the electronic device.

15. A method according to claim 1, wherein the visual and sound effects simulating human activity are separate from any of the television programming received from the broadcast programming.

16. A method according to claim 15, wherein the visual and sound effects simulating human activity is at least one of a turning on and a turning off of at least one of an overhead light and a table lamp in the premises of the user, wherein the light emitted by the television simulates the turning on and the turning off of at least one of the overhead light and the table lamp.

17. A method according to claim 1, wherein the visual and sound effects simulating human activity are sounds of a door opening and closing in the premises of the user, wherein the simulated sound of the door opening and closing is emitted by the television.

18. A method according to claim 1, wherein the visual and sound effects simulating human activity are sounds of an appliance operating in the premises of the user, wherein the simulated sound of the appliance is emitted by the television.

19. A method according to claim 1, wherein setting the electronic device to operate automatically comprises:

receiving from the user setting information, wherein the user setting information sets a future day and time period that corresponds to an absence of the user so that the television presents the visual and sound effects simulating human activity during the future day and time of the absence of the user.

20. A method of simulating occupation of a premises by a user, the method comprising:

receiving, at an electronic device, setting information from the user, wherein the setting information sets a future day and time period that corresponds to an absence of the user so that a television controllably coupled to the electronic device presents visual and sound effects simulating activity of the user during the future day and time of the absence of the user; and during the absence of the user, causing the electronic device to activate the television at different times according to a predetermined schedule within the future day and time period, wherein the predetermined schedule is not set by the user, wherein at a first period of the predetermined schedule the electronic device activates the television to present television programming received in at least one received broadcast channel, wherein at the first period of the predetermined schedule the electronic device activates the television to present simulation of sounds of a door opening and closing in the premises of the user, wherein the simulated sound of the door opening and closing is emitted by the television, wherein at the first period of the predetermined schedule the electronic device activates the television to present simulation of at least one of a turning on and a turning off of at least one of an overhead light and a table lamp in the premises of the user without the presence of a user at the premises, wherein the light emitted by the television simulates the turning on and the turning off of at least one of the overhead light and the table lamp, and wherein at the first period of the predetermined schedule the electronic device activates the television to present simulation of sounds of an appliance operating in the premises of the user, wherein the simulated sound of the appliance is emitted by the television when the user is not present at the premises.

* * * * *